United States Patent [19]
Pfeifer et al.

[11] 3,773,409
[45] Nov. 20, 1973

[54] CONTAINER FOR PHOTOGRAPHIC FILM OR THE LIKE

[75] Inventors: Josef Pfeifer, Unterhaching; Horst Eigner; Wilfried Hofmann, both of Munich, all of Germany

[73] Assignee: Agfa-Gevaert Aktiengesellschaft, Leverkusen, Germany

[22] Filed: Apr. 21, 1972

[21] Appl. No.: 246,259

[30] Foreign Application Priority Data
Apr. 22, 1971 Germany.................... P 21 19 690.7

[52] U.S. Cl..................................... 352/75, 352/78
[51] Int. Cl. .......................................... G03b 23/02
[58] Field of Search .................... 352/72, 75, 76, 78; 95/90, 90.5, 94

[56] References Cited
UNITED STATES PATENTS

| | | | |
|---|---|---|---|
| 2,844,991 | 7/1958 | Badgley | 352/75 |
| 3,275,253 | 9/1966 | Cherniavskyj | 352/72 X |
| 2,597,176 | 5/1952 | Pettus | 352/75 |
| 3,672,290 | 6/1972 | Duesler | 95/94 R |
| 1,863,066 | 7/1932 | Owens | 352/75 |
| 2,152,369 | 3/1939 | Whittaker | 352/75 |
| 2,007,468 | 7/1935 | Fear | 352/72 |

Primary Examiner—Samuel S. Matthews
Assistant Examiner—Alan Mathews
Attorney—Michael S. Striker

[57] ABSTRACT

A container for convoluted photographic film has a housing which is provided with an opening for introduction or withdrawal of film. A light trap which is inwardly adjacent to the opening includes a roller which is provided with axially parallel peripheral ribs and a block having a concave surface which is adjacent to a portion of the peripheral surface of the roller to form therewith an arcuate channel wherein the film advances on its way into or from the chamber. The concave surface of the block is provided with several recesses separated by partitions which form a labyrinth for total reflection of light which happens to penetrate into the channel. At least the roller can be withdrawn from the housing to thus enlarge the passage through which the film can be withdrawn from the interior of the housing so that the container can be used for storage of unexposed film in a motion picture camera or as a receptacle for exposed film in a motion picture projector or as a device for storage of rolls of exposed and developed photographic film.

10 Claims, 3 Drawing Figures

CONTAINER FOR PHOTOGRAPHIC FILM OR THE LIKE

BACKGROUND OF THE INVENTION

The invention relates to containers for photographic film and analogous strip-shaped materials. More particularly, the invention relates to improvements in light traps which are used in such containers to prevent penetration of light into the chamber or chambers which contain unexposed motion picture film or other light-sensitive material.

Presently known containers for photographic film are provided with light traps in the form of strips of felt or similar setose material which surrounds the opening through which the film can be introduced into or withdrawn from the container. The strips of felt are usually bonded to the adjacent surfaces by means of a suitable adhesive and completely seal the interior of the housing against entry of light, provided that the film admitting opening is relatively narrow. Therefore, such light traps are not suitable for use in containers for storage of convoluted motion picture film or the like from which the film must be withdrawn by resorting to suitable film withdrawing and threading devices of the type customarily employed in motion picture projectors or motion picture cameras. Furthermore, such conventional containers must be taken apart in order to introduce into their interior a supply of convoluted unexposed photographic film.

SUMMARY OF THE INVENTION

An object of the invention is to provide a novel and improved container for storage of convoluted photographic film or similar strip-shaped material in such a way that the light cannot reach the stored material in the interior of the container even though the container is provided with an opening through which the strip-shaped material can be introduced into or withdrawn from its interior.

Another object of the invention is to provide a novel and improved light trap for use in containers for photographic film or the like.

A further object of the invention is to provide a container for photographic film with a light trap which is constructed and assembled in such a way that it can prevent entry of light into the container when the latter accommodates a supply of unexposed film but can be converted or removed so as to provide a passage large enough for convenient introduction of certain elements of automatic film feeding or withdrawing mechanisms which are often employed in or in connection with cinematographic apparatus.

Still another object of the invention is to provide a light trap which consists of a small number of simple parts, whose elements can be mass-produced from inexpensive materials, and whose light intercepting action is at least as satisfactory as that of presently known light traps.

One feature of the invention resides in the provision of a container, particularly a cassette or cartridge for storage of photographic film or analogous strip-shaped flexible material. The container comprises a housing which may consist of synthetic plastic material and defines at least one internal chamber and is provided with an opening through which the material can be introduced into or withdrawn from the chamber, and a novel and improved light trap which is provided in the housing in the region of the opening. The light trap includes a first light intercepting element which is preferably a roller and has a convex peripheral surface, and a second light intercepting element which can be permanently or removably mounted in the housing and has a concave surface at least a portion of which is closely adjacent to the convex surface of the roller to form therewith an arcuate channel for the passage of strip-shaped material on its way toward or from the chamber. The concave surface is preferably provided with recesses which are separated from each other by partitions so that the second light intercepting element forms a system of cells together constituting a labyrinth for total reflection of light which happens to penetrate into the arcuate channel between the two surfaces.

The novel features which are considered as characteristic of the invention are set forth in particular in the appended claims. The improved container itself, however, both as to its construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
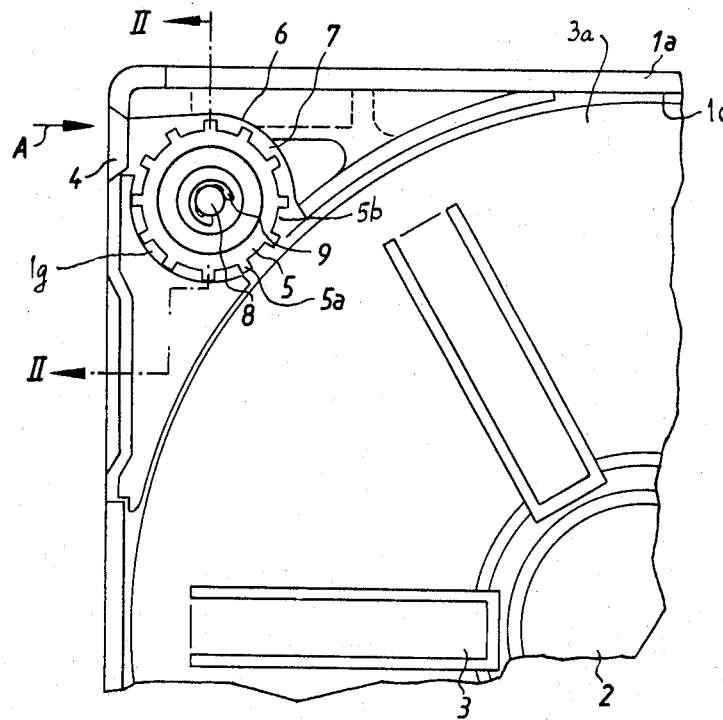
FIG. 1 is a fragmentary plan view of a container which is provided with a light trap emobdying the invention, with the cover of the housing removed.
Figure 2:
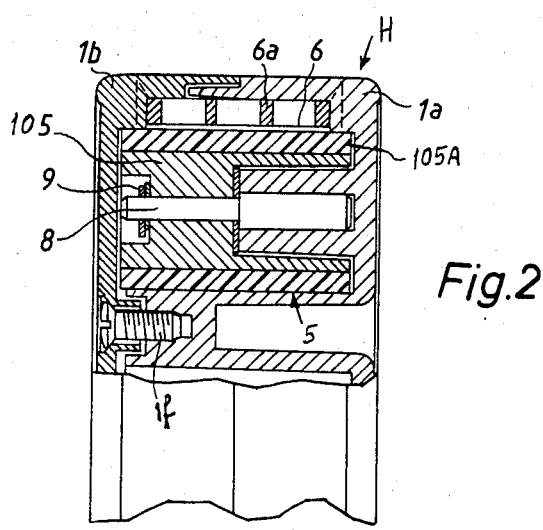
FIG. 2 is a fragmentary sectional view as seen in the direction of arrows from the line II—II in FIG. 1.

Referring first to FIGS. 1 and 2, there is shown a container which comprises a housing H including a main section 1a and a removable second section or cover 1b (shown only in FIG. 2) which is secured to the main section 1a by several screws 1f or analogous fasteners. The two sections of the housing H can be made of synthetic plastic material. The housing H defines at least one internal chamber 1c the central portion of which surrounds a mandrel 2 for the core of a reel or spool 3 having two flanges 3a. The spool 3 is freely rotatable on the mandrel 2 and is provided with a conventional clamping or retaining device (not shown) which can engage and hold the leader of a strip of photographic film so that such leader is clamped to and rotates with the core. The main hosuing section 1a is further provided with an opening 4 which is adjacent to one of its corners (see FIGS. 1 and 3) and extends transversely of one of the end walls of the section 1a. This opening constitutes a mouth through which the film can be introduced into (see the arrow A) or withdrawn from the chamber 1c of the housing.

Figure 3:
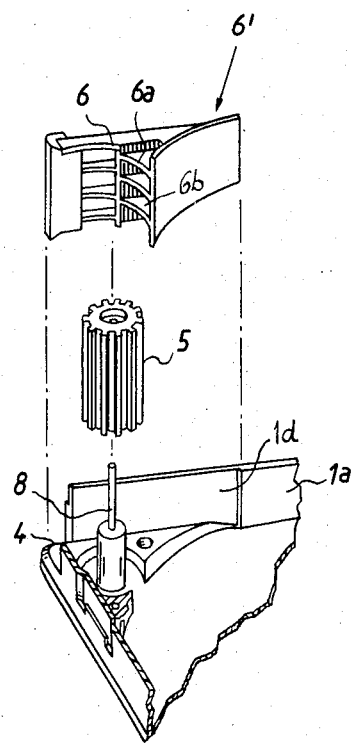
FIG. 3 is an exploded perspective view of the structure shown in the upper left-hand portion of FIG. 1.

In accordance with a feature of the invention, the container is provided with an improved light trap which comprises two light intercepting elements including a movable element 5 and a block-shaped stationary element 6' best shown in FIG. 3. The movable element 5 of the light trap is shown in the form of a cylindrical roller which resembles a gear because its peripheral surface is provided with equidistant axially parallel grooves 5b separated by axially parallel ribs 5a. The peripheral surfaces of the ribs 5a together form a composite convex or cylindrical surface a portion of which is closely adjacent to a concave surface 6 of the stationary light intercepting element 6' so that the two surfaces together form an arcuate channel 7 through which the leader of the film can be introduced into the chamber 1c by moving in the direction indicated by the arrow A. The leader of the thus introduced film automatically advances toward the core of the reel 3 so as to be engaged and retained by the aforementioned clamping device. The roller 5 is automatically set in motion when the film is being introduced into the housing H and passes through the channel 7. Thus, when the leader enters the left-hand end of the channel 7, as viewed in FIG. 1, it may engage one of the ribs 5a of the roller 5 and thereby sets the roller in rotary motion. This facilititates the introduction of film into the chamber 1c and reduces the likelihood that the film would be scratched during travel through the channel 7. At least the periphery of the roller 5 preferably consists of an elastomeric material to further reduce the likelihood of damage to the film. For example, the main part 105 of the roller 5 may consist of a relatively rigid metallic material and the periphery of such rigid roller can be coated with a layer 105A of elastomeric material whereby the elastomeric material 105A provides the aforementioned convex surface including the surfaces at the outer ends of the ribs 5a. If desired, the stationary light intercepting element 6', too, can be coated with a layer of elastomeric material to further reduce the likelihood of damage to the film. It will be noted that the concave surface 6 overlaps or is adjacent to a relatively small portion of the composite convex surface on the roller 5. The lower portion of the roller 5, as viewed in FIG. 1, is immediately adjacent to and can slide along a concave surface 1g of the main housing section 1a to prevent the entry of light into the chamber 1c.

Referring to FIG. 3, it will be seen that the concave surface 6 of the stationary light intercepting element 6' is provided with a plurality of recesses 6b which are separated from each other by partitions 6a. At least some of the partitions 6a are offset relative to the other partitions, and the stationary light intercepting element 6' can be said to constitute a labyrinth consisting of a plurality of cells which insure total reflection of any light that happens to penetrate into the channel 7 so that such light cannot reach the interior of the housing H. Some light is also reflected by the ribs 5a of the rotary light intercepting element 5. It will be noted that the peripheral surfaces of the flanges 3a of the spool 3 are closely adjacent to that end of the channel 7 which is remote from the opening or mouth 4.

FIGS. 2 and 3 show that the rotary light intercepting element 5 is removable from the main housing section 1a. To this end, the section 1a is provided with suitable mounting means incuding a shaft 8 on which the element 5 can rotate adjacent to the inner end of the opening 4. A split ring 9 or a similar retaining device is provided to normally prevent axial movements of the light intercepting element 5 on the shaft 8. If desired, the main housing section 1a can be further provided with suitable mounting means for separably supporting the stationary light intercepting element 6'. As shown in FIG. 3, such mounting means may include a socket 1d into which the element 6' extends so that it is a tight fit in the section 1a to prevent any uncontrolled entry of light into the chamber 1c. The removability of the light intercepting element 5 and/or 6' is desirable because the container can be readily converted into a receptacle for storage of exposed and developed photographic film or into a cassette for reception of convoluted exposed and developed motion picture film which is to be transported through a motion picture projector. As known, such projectors may be provided with automatic film threading devices normally including a stripping member or blade and a roller both of which should enter the interior of the cassette in order to reach the outermost convolution of motion picture film and to automatically expel the leader (namely, the free end of the outermost convolution) for the purpose of advancing such leader along a predetermined path past the film gate and on to the takeup reel or spool of the projector.

It was found that the light intercepting elements 5 and 6' prevent the penetration of any light into the chamber 1c even if the channel 7 does not receive a portion of the film or similar stripped-shaped material. This is attributed to the provision of ribs 5a on the element 5 and also to the provision of partitions 6a and recesses 6b in the concave surface 6 of the stationary light intercepting element 6'. On the other hand, the convex surface of the rotary light intercepting element 5 cooperates with the stationary concave surface 6 to insure convenient introduction of the leader of a photographic film or similar strip-shaped material into the chamber 1c and preferably automatic attachment of the leader to the clamping device of the spool 3.

When the leader of photographic film is to be introduced into the container, such leader is advanced in the direction indicated by the arrow A. As the leader enters the opening 4, its front end engages the nearest rib 5a and sets the roller 5 in motion whereby the leader is compelled to advance in the channel 7 along the concave surface 6 and enters the adjacent portion of the chamber 1c. As the user or a feeding device continues to advance the film into the chamber 1c, the leader advances toward the core of the spool 3 and is automatically attached to the clamping device so that the rotation of the spool thereupon entails the formation of convolutions which surround the core. It will be seen that the rotary light intercepting element 5 not only cooperates with the stationary element 6' to prevent passage of light through the channel 7 and into the chamber 1c but that the element 5 also facilitates the introduction of the leader of film into the interior of the housing H.

As mentioned before, the improved container can be used for reception of a supply of convoluted unexposed photographic film, as a receptacle for a supply of exposed convoluted photographic film, as a receptacle for storage of exposed and developed photographic film, and/or as a cassette which can be inserted into or mounted on a motion picture projector having automatic film threading means which is capable of withdrawing film from the housing H upon removal of the light intercepting element 5 and/or 6'.

It is further clear that the improved container is susceptible of many additional modifications without departing from the spirit of the invention. For example, the periphery of the rotary light intercepting element 5 can be provided with helical grooves and ribs, or it may be otherwise grooved to insure at least some reflection of light to thus further reduce the likelihood of penetration of light into the chamber which houses the film.

Furthermore, the distribution and number of partitions 6a and recesses 6b in the concave surface 6 of the stationary light intercepting element 6' can be varied within a wide range. Still further, the rotary light intercepting element 5 can be mounted in the main section 1a or in the cover 1b of the housing H in a number of ways, as long as it is capable of rotating in response to introduction of the leader of photographic film or the like. Also, the housing H can define two chambers one of which serves for collection of exposed photographic film and the other which serves for storage of unexposed film. Each of the chambers can accommodate a discrete spool. Finally, the configuration of the housing H can be changed and the opening or mouth 4 can be placed at any desired point in the housing section 1a and/or 1b.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A container, particularly for storage of photographic film or analogous strip-shaped flexible material, comprising a housing defining at least one internal chamber and having an opening through which the material can be introduced into and withdrawn from said chamber; and a light trap provided in said housing in the region of said opening, said light trap including a first light intercepting element having a convex surface and a second light intercepting element having a concave surface, at least a portion of one of said surfaces being closely adjacent to the other of said surfaces to form therewith an arcuate channel for the passage of strip-shaped material on its way toward and from said chamber, said second light intercepting element including a plurality of cells having open sides facing said convex surface, said cells together forming a labyrinth including a plurality of partitions having edge faces forming part of said concave surface and defining a plurality of discrete recesses, at least some of said partitions being offset relative to each other.

2. A container as defined in claim 1, wherein one of said light intercepting elements is mounted in said housing for movement relative to the other of said elements.

3. A container as defined in claim 2, wherein said one light intercepting element is a roller and said convex surface is the peripheral surface of said roller.

4. A container as defined in claim 3, wherein said concave surface is adjacent to a relatively small portion of said peripheral surface.

5. A container as defined in claim 3, wherein said peripheral surface is provided with grooves.

6. A container as defined in claim 5, wherein said grooves are at least substantially parallel to the axis of said roller.

7. A container as defined in claim 1, wherein at least one of said light intercepting elements consists at least in part of elastomeric material and the respective surface is provided on said elastomeric material.

8. A container as defined in claim 7, wherein said one element includes a roller and said elastomeric material forms a layer around the periphery of said roller.

9. A container as defined in claim 1, further comprising mounting means provided in said housing for separably supporting at least one of said light intercepting elements.

10. A container as defined in claim 1, further comprising a rotary spool provided in said chamber and having flange means adjacent to that end of said channel which is remote from said opening.

* * * * *